United States Patent
Lim et al.

(10) Patent No.: US 7,814,495 B1
(45) Date of Patent: Oct. 12, 2010

(54) ON-LINE REPLACEMENT AND CHANGING OF VIRTUALIZATION SOFTWARE

(75) Inventors: Beng-Hong Lim, Atherton, CA (US); Kinshuk Govil, Los Altos, CA (US)

(73) Assignee: V Mware, Inc., Palo Alto, CA (US)

( * ) Notice: Subject to any disclaimer, the term of this patent is extended or adjusted under 35 U.S.C. 154(b) by 1230 days.

(21) Appl. No.: 11/394,558

(22) Filed: Mar. 31, 2006

(51) Int. Cl.
G06F 9/455 (2006.01)
G06F 9/46 (2006.01)
G06F 9/44 (2006.01)

(52) U.S. Cl. ............................ 718/104; 718/1; 718/100; 718/105; 717/168; 717/170

(58) Field of Classification Search ........................ None
See application file for complete search history.

(56) References Cited

U.S. PATENT DOCUMENTS

| | | | |
|---|---|---|---|
| 5,488,716 A * | 1/1996 | Schneider et al. ............. 714/10 |
| 6,075,938 A * | 6/2000 | Bugnion et al. ............... 703/27 |
| 6,496,847 B1 * | 12/2002 | Bugnion et al. ................ 718/1 |
| 6,698,017 B1 * | 2/2004 | Adamovits et al. .......... 717/168 |
| 7,146,482 B2 * | 12/2006 | Craddock et al. ........... 711/200 |
| 7,203,944 B1 * | 4/2007 | van Rietschote et al. .... 718/104 |
| 7,296,267 B2 * | 11/2007 | Cota-Robles et al. .......... 718/1 |
| 7,356,679 B1 * | 4/2008 | Le et al. ....................... 713/1 |
| 7,433,951 B1 * | 10/2008 | Waldspurger ............... 709/226 |
| 2002/0013802 A1 * | 1/2002 | Mori et al. ...................... 709/1 |
| 2002/0087611 A1 * | 7/2002 | Tanaka et al. .................. 709/1 |
| 2005/0268298 A1 * | 12/2005 | Hunt et al. ...................... 718/1 |
| 2006/0294337 A1 * | 12/2006 | Hartung et al. ............. 711/173 |
| 2007/0074208 A1 * | 3/2007 | Ling et al. ...................... 718/1 |
| 2008/0163207 A1 * | 7/2008 | Reumann et al. ................ 718/1 |
| 2009/0063749 A1 * | 3/2009 | Dow ............................. 711/6 |
| 2009/0282404 A1 * | 11/2009 | Khandekar et al. ............. 718/1 |

OTHER PUBLICATIONS

Michael Nelson, Beng-Hong Lim and Greg Hutchins, "Fast Transparent Migration for Virtual Machines," USENIX Annual Technical Conference, Proceedings of USENIX '05: General Track, Anaheim, California, USA, pp. 391-394, Apr. 2005.

Kinshuk Govil, Dan Teodosiu, Yongquiang Huang, and Mendel Rosenblum, "Cellular Disco: Resource Management Using Virtual Clusters on Shared-Memory Multiprocessors," $17^{th}$ ACM Symposium on Operating Systems Principles, Kiawah Island, SC, USA, Operating Systems Review 34(5):154-169, Dec. 1999.

David E. Lowell, Yasushi Saito, and Eileen J. Samberg, "Devirtualizable Virtual Machines Enabling General, Single-Node, Online Maintenance," ASPLOS'04, Boston, MA, USA, pp. 211-223, Oct. 2004.

* cited by examiner

*Primary Examiner*—Meng-Ai An
*Assistant Examiner*—Abdullah Al Kawsar

(57) ABSTRACT

In a virtualized system running one or more virtual machines on a first hypervisor, a second hypervisor is installed and control of the hardware resources of the physical computer supporting the virtualized system is migrated from the first hypervisor to the second hypervisor without interrupting the operation of the first hypervisor and the virtual machines. Initially a minimal set of hardware resources is hot-removed from control by the first hypervisor, and the second hypervisor is launched on the minimal set of hardware resources. Both the remaining hardware resources and the virtual machines are then migrated from the first hypervisor to the second hypervisor until all the virtual machines have been migrated over to the second hypervisor, while the virtual machines and the first hypervisor continue running largely unaffected by the migration process.

29 Claims, 5 Drawing Sheets

ON-LINE REPLACEMENT AND CHANGING OF VIRTUALIZATION SOFTWARE

BACKGROUND OF THE INVENTION

1. Field of the Invention

This invention relates generally to computer virtualization and, in particular, to a method and system for on-line replacement and changing of virtualization software

2. Description of the Related Art

The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization also provides greater security, since the virtualization can isolate potentially unstable or unsafe software so that it cannot adversely affect the hardware state or system files required for running the physical (as opposed to virtual) hardware.

As is well known in the field of computer science, a virtual machine (VM) is a software abstraction—a "virtualization"—of an actual physical computer system. FIG. 1 shows one possible arrangement of a computer system 700 that implements virtualization. A virtual machine (VM) 200, which in this system is a "guest," is installed on a "host platform," or simply "host," which will include a system hardware 100, that is, a hardware platform, and one or more layers or co-resident components comprising system-level software, such as an operating system (OS) or similar software layer responsible for coordinating and mediating access to the hardware resources.

As software, the code defining the VM 200 will ultimately execute on the actual system hardware 100. As in almost all computers, this hardware 100 will include one or more CPUs 110, some form of memory 130 (volatile or non-volatile), and one or more devices 170 (including storage devices such as a disk), which may be integral or separate and removable.

In many existing virtualized systems, the hardware processor(s) 110 are the same as in a non-virtualized computer with the same platform, for example, the Intel x-86 platform. Because of the advantages of virtualization, however, some hardware processors have also been developed to include specific hardware support for virtualization.

Each VM 200 will typically mimic the general structure of a physical computer and as such will usually have both virtual system hardware 201 and guest system software 202. The virtual system hardware 201 typically includes at least one virtual CPU 210, virtual memory (VMEM) 230, and one or more virtual devices (VDEVICE) 270 (including at least one virtual disk or similar virtualized mass storage device). All of the virtual hardware components of the VM 200 may be implemented in software to emulate corresponding physical components. The guest system software 202 includes a guest operating system (OS) 220 and drivers 224 as needed, for example, for the various virtual devices 270.

To permit computer systems to scale to larger numbers of concurrent threads, systems with multiple CPUs—physical or logical, or a combination—have been developed. One example is a symmetric multi-processor (SMP) system, which is available as an extension of the PC platform and from other vendors. Essentially, an SMP system is a hardware platform that connects multiple processors to a shared main memory and shared I/O devices. Yet another configuration is found in a so-called "multi-core" architecture, in which more than one physical CPU is fabricated on a single chip, with its own set of functional units (such as a floating-point unit and an arithmetic/logic unit ALU), and can execute threads independently; multi-core processors typically share only very limited resources, for example, some cache. Still another technique that provides for simultaneous execution of multiple threads is referred to as "simultaneous multi-threading," in which more than one logical CPU (hardware thread) operates simultaneously on a single chip, but in which the logical CPUs flexibly share not only one or more caches, but also some functional unit(s) and sometimes also the translation lookaside buffer (TLB).

Similarly, a single VM may (but need not) be configured with more than one virtualized physical and/or logical processor. By way of example, FIG. 1 illustrates multiple virtual processors 210, 211, . . . , 21m (VCPU0, VCPU1, . . . , VCPUm) within the VM 200. Each virtualized processor in a VM may also be multi-core, or multi-threaded, or both, depending on the virtualization. This invention may be used to advantage regardless of the number of processors the VMs are configured to have.

If the VM 200 is properly designed, applications (APPS) 260 running on the VM will function as they would if run on a "real" computer, even though the applications are running at least partially indirectly, that is via the guest OS 220 and virtual processor(s). Executable files will be accessed by the guest OS 220 from the virtual disk or virtual memory 230, which will be portions of the actual physical disk or memory 130 allocated to that VM 200. Once an application 260 is installed within the VM 200, the guest OS 220 retrieves files from the virtual disk just as if the files had been pre-stored as the result of a conventional installation of the application. The design and operation of virtual machines in general are known in the field of computer science.

Some interface is generally required between the guest software within a VM 200 and the various hardware components and devices in the underlying hardware platform. This interface—referred to in this text as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, "hypervisor" is often used to describe both a VMM and a kernel together, either as separate but cooperating components or with one or more VMMs incorporated wholly or partially into the kernel itself; however, "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself.

Unless otherwise indicated, the invention described below may be used in virtualized computer systems having any type or configuration of virtualization software. Moreover, the invention is described and illustrated below primarily as including one or more virtual machine monitors that appear as separate entities from other components of the virtualization software. This is only for the sake of simplicity and clarity and by way of illustration—as mentioned above, the distinctions are not always so clear-cut. Again, unless otherwise indicated or apparent from the description, it is to be assumed that the invention can be implemented anywhere within the overall structure of the virtualization software.

By way of illustration and example only, the figures show each VM running on a corresponding virtual machine monitor. The description's reference to VMMs is also merely by way of common example. A VMM is usually a software component that virtualizes at least one hardware resource of some physical platform, so as to export a hardware interface to the VM corresponding to the hardware the VM "thinks" it is running on. As FIG. 1 illustrates, a virtualized computer system may (and usually will) have more than one VM, each of which may be running on its own VMM.

The various virtualized hardware components in the VM 200, such as the virtual CPU(s) 210, etc., the virtual memory 230, and the virtual device(s) 270, are shown as being part of the VM 200 for the sake of conceptual simplicity. In actuality, these "components" are often implemented as software emulations included in the VMM 300. One advantage of such an arrangement is that the virtualization software may (but need not) be set up to expose "generic" devices, which facilitate, for example, migration of VM from one hardware platform to another.

Different systems may implement virtualization to different degrees—"virtualization" generally relates to a spectrum of definitions rather than to a bright line, and often reflects a design choice in respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to the other virtualization software. According to this view, loading a module such as a driver designed to communicate with other virtualization components renders the system para-virtualized, even if the guest OS as such is an off-the-shelf, commercially available OS not specifically designed to support a virtualized computer system.

Unless otherwise indicated or apparent, this invention is not restricted to use in systems with any particular "degree" of virtualization and is not to be limited to any particular notion of full or partial ("para-") virtualization.

In addition to the distinction between full and partial (para-) virtualization, two arrangements of intermediate system-level software layer(s) are in general use as, or as part of, the virtualization software—a "hosted" configuration (illustrated in FIG. 2) and a non-hosted configuration (illustrated in FIG. 1). In a hosted virtualized computer system, an existing, general-purpose operating system forms a "host" OS 420 that is used to perform certain input/output (I/O) operations, alongside and sometimes at the request and direction of a virtualization software component such as the VMM 300. The host OS 420 usually includes drivers 424 and supports applications 460 of its own, and the VMM 300 (or similar component) are both able to directly access at least some of the same hardware resources, with conflicts being avoided by a context-switching mechanism. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

In addition to device emulators 370, FIG. 2 also illustrates some of the other components that are also often included in the VMM of a hosted virtualization system; many of these components are found in the VMM of a non-hosted system as well. For example, exception handlers 330 may be included to help context-switching (see again U.S. Pat. No. 6,496,847), and a direct execution engine 310 and a binary translator 320, often with an associated translation cache 325, may be included to provide execution speed while still preventing the VM 200 from directly executing certain privileged instructions in systems that do not otherwise provide such protection (see U.S. Pat. No. 6,397,242, Devine, et al., "Virtualization System Including a Virtual Machine Monitor for a Computer with a Segmented Architecture," 28 May 2002).

In many cases, it may be beneficial to deploy VMMs on top of a software layer—a kernel 600—constructed specifically to provide efficient support for the VMs. This configuration is frequently referred to as being "non-hosted." Compared with a system in which VMMs (or other software components or layers with similar functionality) run directly on the hardware platform (such as shown in FIG. 2), use of a kernel 600 offers greater modularity and facilitates provision of services (for example, resource management) that extend across multiple virtual machines. Compared with a hosted deployment, a kernel 600 may offer greater performance because it can be co-developed with the VMM and be optimized for the characteristics of a workload consisting primarily of VMs/VMMs. The kernel 600 also handles any other applications running on it that can be separately scheduled, as well as any temporary "console" operating system (COS) 420 that, in some systems, is included for such operations as boot the system as a whole or enabling certain user interactions with the kernel. The console OS 420 in FIG. 1 may be of the same type as the host OS 420 in FIG. 2, which is why they are identically numbered—the main difference is the role they play (or are allowed to play, if any) once the virtualized computer system is loaded and running. One example of a non-hosted, virtualized computer system is described in U.S. Pat. No. 6,961,941 (Nelson, et al., "Computer Configuration for Resource Management in Systems Including a Virtual Machine," 1 Nov. 2005.)

The present invention as described herein may be used to advantage in both a hosted and a non-hosted virtualized computer system, regardless of the degree of virtualization, in which the virtual machine(s) have any number of physical and/or logical virtualized processors. The present invention may also be implemented directly in a computer's primary OS, both where the OS is designed to support virtual machines and where it is not. Moreover, the invention may even be implemented wholly or partially in hardware, for example in processor architectures intended to provide hardware support for virtual machines.

In the description of the preferred embodiment of the invention below, the term "hypervisor" is used to refer collectively to any software layer(s) and component(s) that are or perform the functions of a virtual machine monitor and kernel, including the case in which the VMM(s) and kernel are implemented as a single body of code.

Certain situations arise in which the hypervisor needs to be replaced, updated or changed to another version. For example, a new version of the hypervisor may have to be installed on the system hardware 100 to upgrade the hypervisor. Conventional virtualized systems required the hypervisor and all VMs and applications running on the hypervisor to be shut down to install a new version of the hypervisor, because the conventional virtualized systems were not able to support two or more instances of the hypervisor sharing the system hardware 100. Shutting down the hypervisor has the disadvantage of disrupting the operation of the VMs and the applications running on the VMs, causing downtime for system maintenance.

There has been some research in the areas of running multiple hypervisors on system hardware. The Cellular Disco project is an example of such research, and is described in Kinshuk Govil et al., "Cellular Disco: resource management using virtual clusters on shared-memory multiprocessors," 17$^{th}$ ACM Symposium on Operating Systems Principles, Published as Operating Systems Review 34(5): pp. 154-0169, December 1999. However, this Cellular Disco paper merely describes partitioning hardware resources into separate pieces and running multiple VMs on different, partitioned pieces of the hardware resources in general, but does not disclose the concept of transferring control of hardware resources from one hypervisor to another hypervisor so that another hypervisor can be installed without disrupting the operation of the VMs. The Cellular Disco paper also describes allowing different instances of the hypervisor to temporarily loan and borrow hardware resources, but does not disclose the concept of allowing for permanent transfer of the control and ownership of the hardware sources from one hypervisor to another hypervisor. There has been other research in related areas, such as cluster-based hypervisor replacement which uses new hardware resources and changes from one hypervisor running on one set of hardware resources to another hypervisor running on another separate set of hardware resources, but such cluster-based hypervisor replacement fails to solve the problem of changing to another hypervisor to run on the same set of hardware resources.

Therefore, there is a need for a technique for changing from one hypervisor to another hypervisor to run on the same hardware resources in a virtualized system without disrupting the operation of the virtual machines.

SUMMARY OF THE INVENTION

In a virtualized system running one or more virtual machines on a first hypervisor, a second hypervisor is installed and control of the hardware resources of the physical computer supporting the virtualized system is transferred from the first hypervisor to the second hypervisor without interrupting the operation of the first hypervisor and the virtual machines. Initially a minimal set of hardware resources is hot-removed from control by the first hypervisor. The second hypervisor is launched to run on the minimal set of hardware resources. Both the remaining hardware resources and the virtual machines are then migrated by being hot-removed from the first hypervisor and hot-added to the second hypervisor until all the virtual machines have been migrated over to the second hypervisor, while the virtual machines continue running largely unaffected by the migration process and both of the hypervisors continue to run during the migration process. When all the virtual machines have been migrated to the second hypervisor, the first hypervisor is shut down, and any remaining hardware resources are transferred to the second hypervisor.

An advantage of the hypervisor replacement in accordance with the present invention is that it is possible to update hypervisors and migrate the control of hardware resources from one hypervisor to another hypervisor without shutting down the original hypervisor or virtual machines during the replacement process. Migrating the control of hardware resources from one hypervisor to another hypervisor also obviates the need for copying data in the virtual machine memories before, during, or after the migration process. Access to the I/O devices is not lost before, during, or after the hypervisor migration process. Therefore, the present invention achieves fast, non-disruptive, and online updating, replacement, or changing of virtual machine hypervisors.

The features and advantages described in the specification are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the present invention can be readily understood by considering the following detailed description in conjunction with the accompanying drawings.

DETAILED DESCRIPTION OF EMBODIMENTS

The Figures (FIG.) and the following description relate to preferred embodiments of the present invention by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

Figure 1:
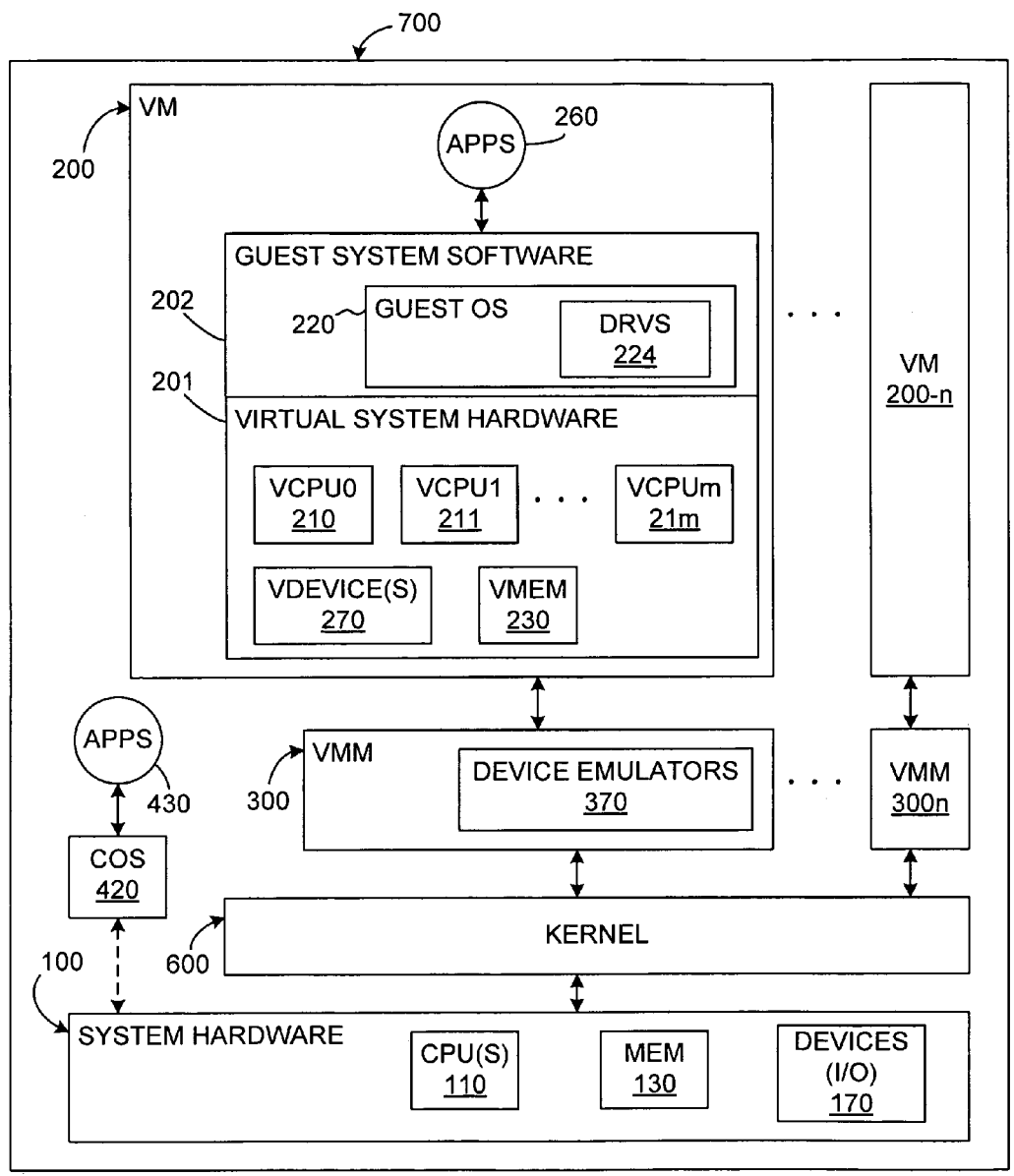
FIG. 1 illustrates a non-hosted virtualized system.
Figure 2:
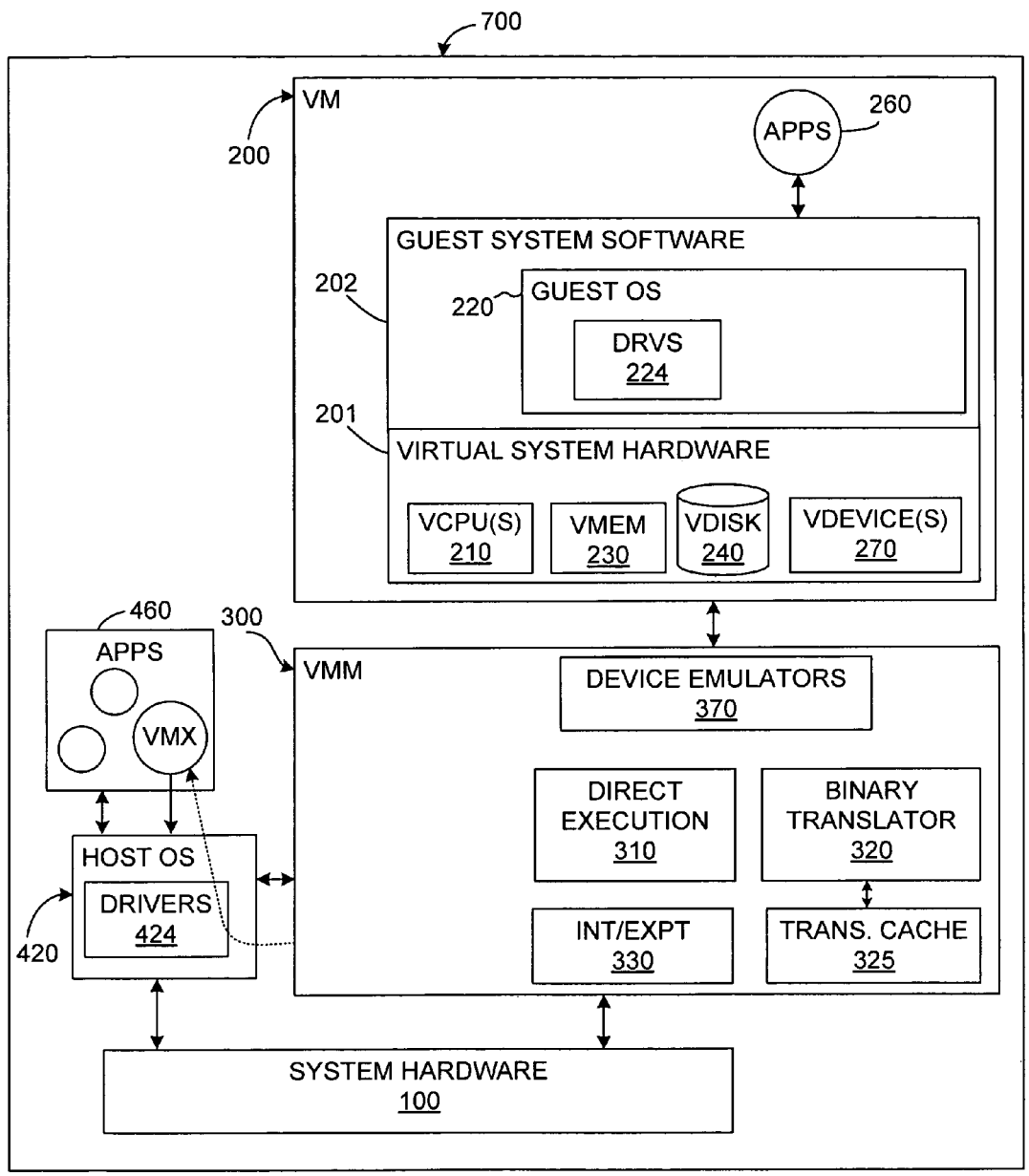
FIG. 2 illustrates a hosted virtualized system.
Figure 3:
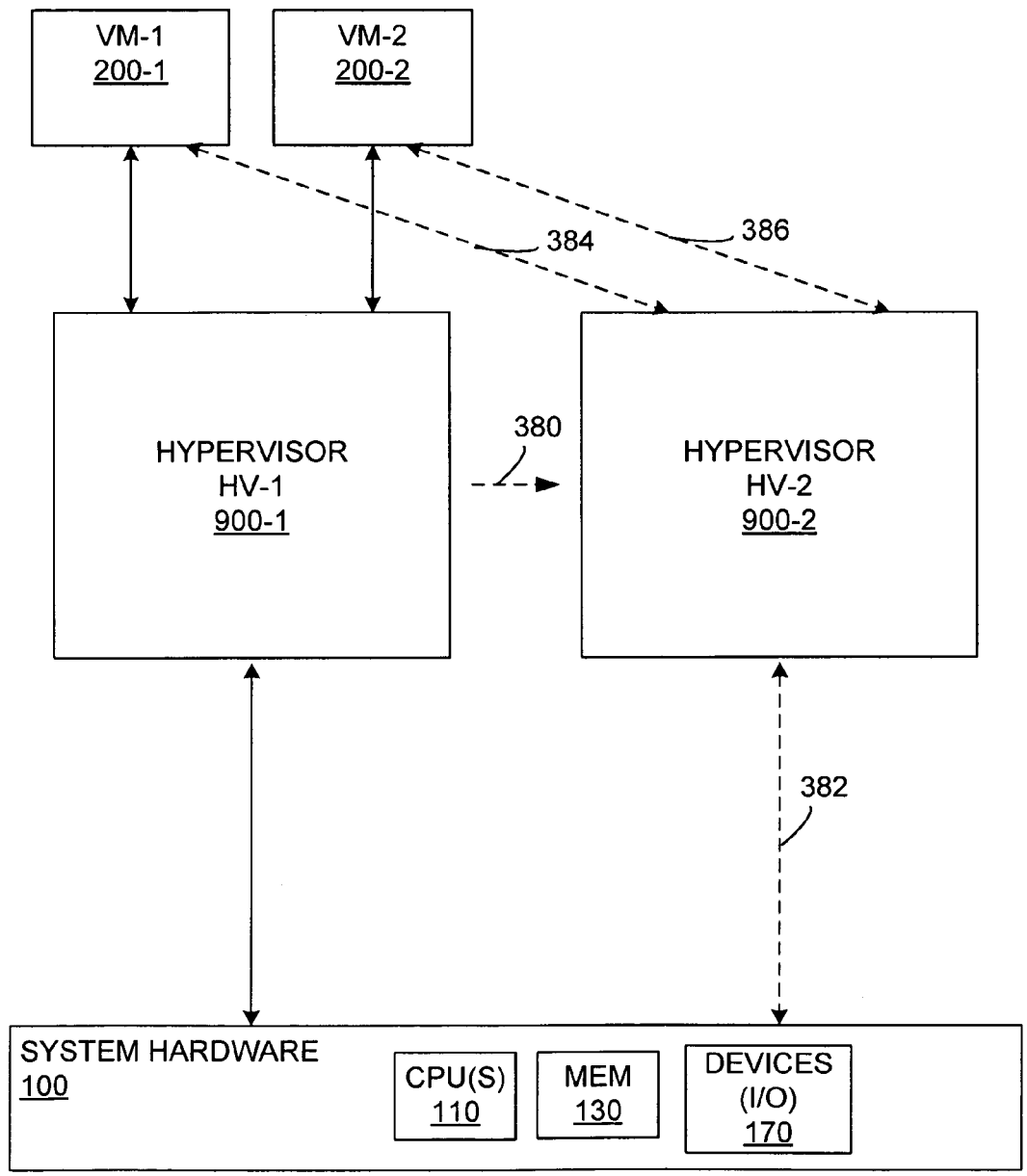
FIG. 3 illustrates the replacement of hypervisors in a virtualized system, according to one embodiment of the present invention.

FIG. 3 illustrates the replacement or change of hypervisors in a virtualized system, according to one embodiment of the present invention. According to the present invention, it is possible to migrate (illustrated as arrow 380) the control of hardware resources 100 from one hypervisor 900-1 (HV-1) to another hypervisor 900-2 (HV-2) and also migrate (illustrated as arrows 384, 386) the VMs 200-1, 200-2 (VM-1, VM-2) running on the hypervisor 900-1 (HV-1) to hypervisor 900-2 (HV-2) without shutting down the hypervisor 900-1 (HV-1) during the migration process until the migration is complete. The virtual machine memory 230 (VMEM) in the VMs 200-1, 200-2 do not need to be copied before, during, or after the migration, and the VMs do not lose access to the I/O devices 170 before, during, or after the migration.

Note that the hypervisor replacement process (illustrated as arrow 380) is illustrated in FIG. 3 in the context of a hosted virtual system, however it should be noted that the hypervisor replacement process according to the present invention can be equally used in a non-hosted virtualized system. Therefore, the hypervisor replacement process according to the present invention is not limited to a particular type of virtualized system, non-hosted or hosted, and fully virtualized or paravirtualized.

In one embodiment, the software for hypervisor replacement according to the present invention is contained in the hypervisor itself, for example in HV-1 900-1. However, the software can be stored elsewhere, for example, in other parts of the virtualization software, or can be implemented entirely or partially in the form of hardware devices. As such, the present invention is not limited to a particular form or location of the software. Regardless of the location, the software for hypervisor replacement according to the present invention is physically stored in a computer readable medium such as a disk or memory 130 in the system hardware 100.

The hardware resources 100 include the CPUs 110, memory 130, and I/O devices 170 (which include disks or other types of mass storage devices). In one embodiment of the present invention, the system hardware 100 includes multiple CPUs 110 and the I/O devices 170 are multi-path I/O devices. In such embodiment, multiple instances of the hypervisor are configured to run on separate CPUs and control a separate path of the multi-path I/O devices during the hypervisor migration process.

However, note that the CPU 100 can be a single CPU or the I/O device 170 can also be a single path I/O device in another embodiment. In such embodiment, multiple instances of the hypervisor share control of the single CPU 100 and/or the single I/O device 170 during the hypervisor replacement process in a time-shared manner, such that each hypervisor controls the single CPU 100 and/or the single I/O device 170 in different time slots during the hypervisor replacement process. Shared mutual exclusion routines (mutexes) are used to flag and coordinate which hypervisor controls a particular I/O device or other device, so that each device is controlled by only one hypervisor at a time.

In order to replace (illustrated as arrow 380) the hypervisors and migrate (illustrated as arrows 384, 386) the VMs, initially a minimal set of hardware resources 100 is hot-removed from control by HV-1 900-1 and used to start 382 the new hypervisor (HV-2) 900-2 on the system hardware 100. The term "hot-remove" is used herein to refer to removing hardware resources without shutting down the hypervisor (e.g., HV-1 in this example) that is running on the removed hardware resources. The hot-removed hardware resources are used to start a new hypervisor (HV-2) 900-2. Then, both the remaining hardware resources 100 and the VMs 200-1, 200-2 are migrated from the original hypervisor (HV-1) 900-1 to the new hypervisor (HV-2) 900-2 while the virtual machines continue running largely unaffected by the migration process and the original hypervisor (HV-1) 900-1 continue to run during the migration process. When all the VMs 200-1, 200-2 have been migrated to the new hypervisor (HV-2) 900-2, the original hypervisor (HV-1) 900-1 is shut down. Any remaining hardware resources are further migrated to the new hypervisor (HV-2) 900-2.

More specifically, ownership and control of the hardware resources 100 are migrated from the hypervisor (HV-1) 900-1 to the hypervisor (HV-2) 900-2 by first hot-removing the hardware resource from the hypervisor (HV-1) 900-1 and then hot-adding the hardware resource to the hypervisor (HV-2) 900-2. Hot-removing a hardware resource is accomplished by the hypervisor (HV-1) 900-1 first modifying its hardware resource scheduling algorithm to stop using the resource to be removed. This may trigger failover of I/O to an alternate device that's attached to the same network or storage. Next, the hypervisor (HV-1) 900-1 informs its device drivers or emulators 330 to stop using the device, and if there were only one instance of that device remaining for the device driver 330, the hypervisor (HV-1) 900-1 may unload the device driver as well. Next, the hypervisor (HV-1) 900-1 removes the hardware resource from its hardware inventory. On virtualized systems with hardware support for multiple instances, the hypervisor (HV-1) 900-1 also informs the virtualized system (e.g., to a hardware register) that it is no longer using the particular hardware resource.

Hot-adding the resource to the hypervisor (HV-2) 900-2 is accomplished by performing the reverse of the steps for hot-removing the resource with respect to the hypervisor (HV-2) 900-2. Specifically, the hardware resource is informed that the new hypervisor (HV-2) 900-2 is going to use the new hardware resource. Then, the new hardware resource is added to the new hypervisor's (HV-2) inventory of hardware resources. If the driver for that new hardware resource is not already loaded to the new hypervisor (HV-2) 900-2, the new hypervisor (HV-2) loads the device driver. Otherwise, the new hypervisor (HV-2) informs the device driver of the new hardware resource. In addition, if applicable, the multi-path I/O system is notified of the new I/O path. Then, the resource manager of the new hypervisor (HV-2) 900-2 starts to use the newly added hardware resource.

Such migration occurs for the CPUs 110, the memory 130, and the I/O devices 170 (including a disk or other type of mass storage device). In one embodiment where the CPUs 110 include multiple processors and the I/O devices 170 are multi-path I/O devices, migration of the hardware resources occurs by migrating control and ownership of certain processors or paths of the I/O devices to the new hypervisor (HV-2) 900-2. For example, in the case of multiple CPUs 110, control of each of the CPUs can be migrated to the new hypervisor (HV-2) 900-2 one by one. For another example, in the case of a dual-path I/O device with two NICs (Network Interface Cards), control of the second path NIC can be migrated to the new hypervisor (HV-2) 900-2 while the first path NIC is still being controlled by the original hypervisor (HV-1) 900-1. In another embodiment where there is a single CPU 110 and the I/O devices 170 are single-path I/O devices, migration of the hardware resources occurs by migrating control and ownership of certain time slots of the usage of the processors or the I/O devices to the new hypervisor (HV-2) 900-2 while coordinating the usage and control of such hardware resources by using passive mechanisms such as mutexes or other mechanisms for active coordination such as an I/O APIC (Input/Output Advanced Programmable Interrupt Controller). During the migration process, the new hypervisor (HV-2) 900-2 requests the original hypervisor (HV-1) 900-1 to perform the I/O operations on its behalf.

In a virtualized system, different portions or pages of the memory 130 can be allocated to either the VMs or the hypervisor itself. If certain portions or pages of the memory 130 are allocated to the VMs, the control of the memory 130 can be migrated together with copying of the data stored in the memory 130. If certain portions or pages of the memory 130 are allocated to the hypervisor (HV-1) 900-1 itself, the control of the memory 130 is migrated after the memory has been freed by the hypervisor (HV-1) 900-1.

The VMs can also be migrated (illustrated as arrows 384, 386) from the old hypervisor (HV-1) 900-1 to the new hypervisor (HV-2) 900-2 without the copying of data for the page contents in the VMEM 230. Rather, only the ownership and control of memory pages allocated to the VMs are transferred from the old hypervisor (HV-1) 900-1 to the new hypervisor (HV-2) 900-2. This allows the hypervisor replacement process to be fast and efficient, since data in the VMEM 230 need not be copied.

Figure 4:
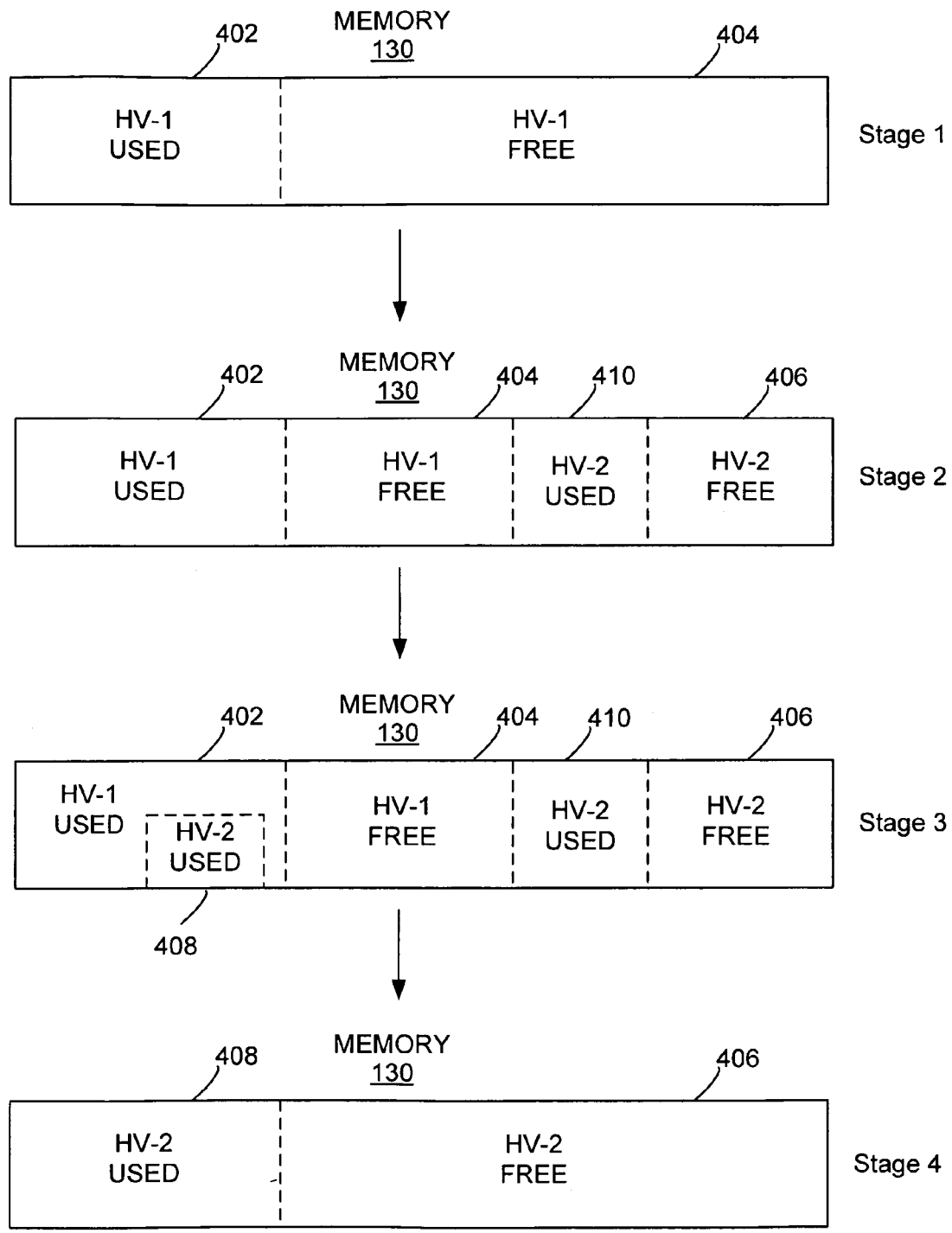
FIG. 4 illustrates how the memory usage transitions during the replacement of hypervisors in a virtualized system, according to one embodiment of the present invention.

FIG. 4 illustrates memory usage transitions during replacement of hypervisors in a virtualized system, according to one embodiment of the present invention. In one embodiment, the separate portions of the memory 130 described in FIG. 3 may be divided by memory pages in the memory 130. At stage 1, a portion 402 of the memory 130 is used by the hypervisor (HV-1) 900-1 and the remaining portion 404 of the memory 130 is free to be used by the hypervisor (HV-1) 900-1. Then at stage 2, a portion 406 of the free memory 404 is freed up for the new hypervisor (HV-2) 900-2 to be launched, and a small portion 410 is also used by the new hypervisor (HV-2) 900-2 for its own use even if no VM is running on the new hypervisor (HV-2) 900-2 at this point. At stage 3, the hypervisor (HV-2) 900-2 is launched and uses a portion 408 of the part 402 of the memory 130 that was being used by the old hypervisor (HV-1) 900-1. The portion 408 represents a transfer of ownership and control of a part of the portion 402 that was previously used by the hypervisor (HV-1) 900-1 to the use by the VMs running on the new hypervisor (HV-2) 900-2. Finally at stage 4 when the hypervisor replacement process is complete and the old hypervisor (HV-1) 900-1 is shut down, only the hypervisor (HV-2) 900-2 uses the portion 408 of the memory 130 while the remaining portion 406 is free to be used by the hypervisor (HV-2) 900-2. The portion 410 would be subsumed into the portion 408.

Figure 5:
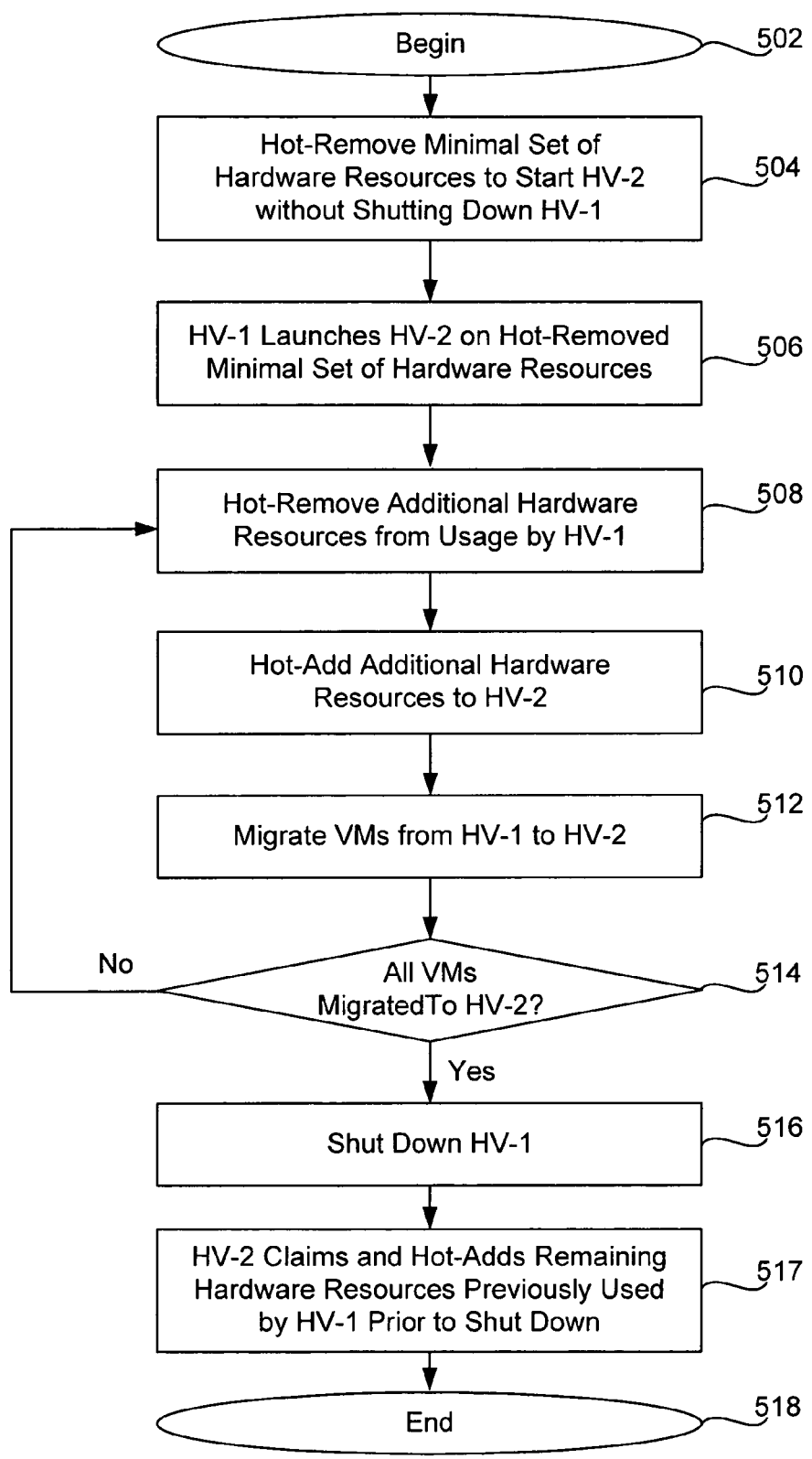
FIG. 5 illustrates a method of changing hypervisors in a virtualized system, according to one embodiment of the present invention.

FIG. 5 illustrates a method of changing hypervisors in a virtualized (including both fully virtualized and para-virtualized) computer system, according to one embodiment of the present invention. As the process begins 502, a minimal set of hardware resources 100 is hot-removed 504 from control by the hypervisor (HV-1) 900-1 to start the new hypervisor (HV-2) 900-2 without shutting down the old hypervisor (HV-1) 900-1. The hypervisor (HV-1) 900-1 launches 506 the new hypervisor (HV-2) 900-2 on the hot-removed minimal set of hardware resources.

Now that the new hypervisor (HV-2) 900-2 is running, additional hardware resources are removed 508 from usage by the hypervisor (HV-1) 900-1 and hot-added 510 to the new hypervisor (HV-2) 900-2. The virtual machines and the hypervisor (HV-1) 900-1 continue running largely unaffected by the migration process of the hardware resources. In addition, the VMs running on the hypervisor (HV-1) 900-1 are migrated 512 to run on the new hypervisor (HV-2) 900-2. In one embodiment, the VMs are migrated 512 to the new hypervisor (HV-2) 900-2 one at a time, although the VMs could be migrated in different numbers in other embodiments. Steps 508-510-512 are repeated until it is determined in step 514 that all VMs are migrated to the new hypervisor (HV-2) 900-2, at which time the old hypervisor (HV-1) 900-1 is shut down 516, all remaining hardware resources previously used by the old hypervisor (HV-1) 900-1 are claimed by 517 and hot-added 517 to the new hypervisor (HV-2) 900-2, and the process ends 518.

Although FIGS. 4 and 5 describe the embodiment in which the new hypervisor (HV-2) 900-2 is newly installed, the present invention is also applicable to the situation in which two hypervisors are already up and running and ownership and control of the hardware resources are migrated from one hypervisor to the other hypervisor. For example, one may want to run multiple hypervisors at the same time in a security application where the different hypervisors deal with VMs of different security levels. In such a system, if one wanted to move VMs or hardware resources from one security level to another, then the method of changing the hypervisor as described herein would still apply.

The present invention has the advantage that it is possible to update hypervisors and migrate the control of hardware resources from one hypervisor to another hypervisor without shutting down the hypervisor or virtual machines or the operating system and applications inside the virtual machines during the update process. Migrating the control of hardware resources from one hypervisor to another hypervisor also obviates the copying of data in the virtual machine memories before, during, or after the migration process. Access to the I/O devices is not lost before, during, or after the hypervisor replacement process. Therefore, the present invention achieves fast, non-disruptive, and on-line updating of virtual machine hypervisors.

Upon reading this disclosure, those of skill in the art will appreciate still additional alternative embodiments for updating virtual machine hypervisors through the disclosed principles of the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. In a virtualized computer system running one or more virtual machines on a first hypervisor virtualizing hardware resources of a physical computer, the hardware resources including a single-path input/output (I/O) device with a single I/O path, a computer implemented method of installing a second hypervisor on the physical computer and migrating control of the hardware resources from the first hypervisor to the second hypervisor, the method comprising:

removing a predetermined set of the hardware resources of the physical computer from usage by the first hypervisor;

launching the second hypervisor to utilize the predetermined set of the hardware resources; and migrating remaining hardware resources of the physical computer and the virtual machines from being controlled by the first hypervisor to being controlled by the second hypervisor with the first hypervisor running simultaneously with the second hypervisor during the migration, the second hypervisor sharing access to the single path I/O device with the first hypervisor in different time slots, the first hypervisor and the second hypervisor using a mutex to coordinate the shared access to the single-path I/O device.

2. The computer-implemented method of claim 1, wherein the step of migrating includes repeatedly performing the following steps until all the virtual machines are migrated from the first hypervisor to the second hypervisor:
- removing at least a part of the remaining hardware resources from usage by the first hypervisor;
- adding said removed part of the remaining hardware resources to usage by the second hypervisor; and
- migrating at least one of the virtual machines from the first hypervisor to the second hypervisor.

3. The computer-implemented method of claim 1, further comprising shutting down the first hypervisor after all the virtual machines are migrated from the first hypervisor to the second hypervisor.

4. The computer-implemented method of claim 1, wherein the hardware resources include a plurality of central processing units, and migrating the hardware resources includes migrating a selected one of the central processing units from the first hypervisor to the second hypervisor.

5. The computer-implemented method of claim 1, wherein the hardware resources include a single central processing unit, and migrating the hardware resources includes having the second hypervisor share the central processing unit with the first hypervisor in different time slots.

6. The computer-implemented method of claim 1, wherein the hardware resources include a multi-path input/output (I/O) device with a plurality of I/O paths, and migrating the hardware resources include migrating a selected one of the paths of the I/O device from the first hypervisor to the second hypervisor.

7. The computer-implemented method of claim 1, wherein the hardware resources include a memory device including a plurality of memory pages, and migrating the hardware resources include having the first hypervisor and the second hypervisor control separate pages of the memory device.

8. The computer-implemented method of claim 1, wherein migrating the virtual machines from the first hypervisor to the second hypervisor comprises having the virtual machines run on the second hypervisor without copying data in a virtual machine memory of the virtual machines during the migration.

9. The computer-implemented method of claim 1, wherein the virtualized system is a non-hosted virtualized system.

10. The computer-implemented method of claim 1, wherein the virtualized system is a hosted virtualized system.

11. The computer-implemented method of claim 1, wherein the virtualized system is a para-virtualized system.

12. A computer readable medium storing a computer program product configured to perform a computer-implemented method for migrating control of hardware resources of a physical computer from a first hypervisor to a second hypervisor and installing the second hypervisor on the physical computer, in a virtualized computer system running one or more virtual machines on the first hypervisor, the first hypervisor and the second hypervisor configured to virtualize the hardware resources of the physical computer, the hardware resources including a single-path input/output (I/O) device with a single I/O path, the method comprising:
- removing a predetermined set of the hardware resources from usage by the first hypervisor;
- launching the second hypervisor to utilize the predetermined set of the hardware resources; and
- migrating remaining hardware resources of the physical computer and the virtual machines from being controlled by the first hypervisor to being controlled by the second hypervisor with the first hypervisor running simultaneously with the second hypervisor during the migration, the second hypervisor sharing access to the single path I/O device with the first hypervisor in different time slots, the first hypervisor and the second hypervisor using a mutex to coordinate the shared access to the single-path I/O device.

13. The computer readable medium 'of claim 12, wherein the step of migrating includes repeatedly performing the following steps until all the virtual machines are migrated from the first hypervisor to the second hypervisor:
- removing at least a part of the remaining hardware resources from usage by the first hypervisor;
- adding said removed part of the remaining hardware resources to usage by the second hypervisor; and
- migrating at least one of the virtual machines from the first hypervisor to the second hypervisor.

14. The computer readable medium of claim 12, wherein the method further comprises shutting down the first hypervisor after all the virtual machines are migrated from the first hypervisor to the second hypervisor.

15. The computer readable medium of claim 12, wherein the hardware resources include a plurality of central processing units, and migrating the hardware resources include migrating a selected one of the central processing units from the first hypervisor to the second hypervisor.

16. The computer readable medium of claim 12, wherein the hardware resources include a single central processing unit, and migrating the hardware resources include having the second hypervisor share the central processing unit with the first hypervisor in different time slots.

17. The computer readable medium of claim 12, wherein the hardware resources include a multi-path input/output (I/O) device with a plurality of I/O paths, and migrating the hardware resources include migrating a selected one of the paths of the I/O device from the first hypervisor to the second hypervisor.

18. The computer readable medium of claim 12, wherein the hardware resources include a memory device including a plurality of memory pages, and migrating the hardware resources include having the first hypervisor and the second hypervisor control separate pages of the memory device.

19. The computer readable medium of claim 12, wherein migrating the virtual machines from the first hypervisor to the second hypervisor comprises having the virtual machines run on the second hypervisor without copying data in a virtual machine memory of the virtual machines during the migration.

20. A virtualized computer system running one or more virtual machines on a first hypervisor virtualizing hardware resources of a physical computer, the physical computer including a storage device storing computer instructions configured to perform a computer-implemented method of migrating control of the hardware resources of the physical computer from the first hypervisor to a second hypervisor and installing the second hypervisor on the physical computer, the physical computer further including one or more central processing units for executing the computer instructions, the first hypervisor and the second hypervisor being configured to virtualize the hardware resources of the physical computer, the hardware resources including a single-path input/output (I/O) device with a single I/O path, the method comprising:
- removing a predetermined set of the hardware resources from usage by the first hypervisor;
- launching the second hypervisor to utilize the predetermined set of the hardware resources; and
- migrating remaining hardware resources of the physical computer and the virtual machines from being controlled by the first hypervisor to being controlled by the second hypervisor with the first hypervisor running simultaneously with the second hypervisor during the migration, the second hypervisor sharing access to the single path I/O device with the first hypervisor in different time slots, the first hypervisor and the second hypervisor using a mutex to coordinate the shared access to the single-path I/O device.

21. The virtualized computer system of claim 20, wherein the step of migrating includes repeatedly performing the following steps until all the virtual machines are migrated from the first hypervisor to the second hypervisor:
removing at least a part of the remaining hardware resources from usage by the first hypervisor;
adding said removed part of the remaining hardware resources to usage by the second hypervisor; and
migrating at least one of the virtual machines from the first hypervisor to the second hypervisor.

22. The virtualized computer system of claim 20, wherein the method further comprises shutting down the first hypervisor after all the virtual machines are migrated from the first hypervisor to the second hypervisor.

23. The virtualized computer system of claim 20, wherein the hardware resources include a plurality of central processing units, and migrating the hardware resources includes migrating a selected one of the central processing units from the first hypervisor to the second hypervisor.

24. The virtualized computer system of claim 20, wherein the hardware resources include a single central processing unit, and migrating the hardware resources includes having the second hypervisor share the central processing unit with the first hypervisor in different time slots.

25. The virtualized computer system of claim 20, wherein the hardware resources include a multi-path input/output (I/O) device with a plurality of I/O paths, and migrating the hardware resources include migrating a selected one of the paths of the I/O device from the first hypervisor to the second hypervisor.

26. The virtualized computer system of claim 20, wherein the hardware resources include a memory device including a plurality of memory pages, and migrating the hardware resources includes having the first hypervisor and the second hypervisor control separate pages of the memory device.

27. The virtualized computer system of claim 20, wherein migrating the virtual machines from the first hypervisor to the second hypervisor comprises having the virtual machines run on the second hypervisor without copying data in a virtual machine memory of the virtual machines during the migration.

28. In a virtualized computer system running one or more virtual machines on a first hypervisor virtualizing hardware resources of a physical computer, a computer-implemented method of changing control of the hardware resources from the first hypervisor to a second hypervisor, the hardware resources including a single-path input/output (I/O) device with a single I/O path, the method comprising:
removing a predetermined set of the hardware resources of the physical computer from usage by the first hypervisor;
running the second hypervisor to utilize the predetermined set of the hardware resources; and
migrating remaining hardware resources of the physical computer and the virtual machines from being controlled by the first hypervisor to being controlled by the second hypervisor with the first hypervisor running simultaneously with the second hypervisor during the migration, the second hypervisor sharing access to the single path I/O device with the first hypervisor in different time slots, the first hypervisor and the second hypervisor using a mutex to coordinate the shared access to the single-path I/O device.

29. A computer readable medium storing a computer program product configured to perform a computer-implemented method for migrating control of hardware resources of a physical computer from a first hypervisor to a second hypervisor in a virtualized computer system running one or more virtual machines on the first hypervisor, the first hypervisor and the second hypervisor being configured to virtualize the hardware resources of the physical computer, the hardware resources including a single-path input/output (I/O) device with a single I/O path, the method comprising:
removing a predetermined set of the hardware resources of the physical computer from usage by the first hypervisor;
running the second hypervisor to utilize the predetermined set of the hardware resources; and
migrating remaining hardware resources of the physical computer and the virtual machines from being controlled by the first hypervisor to being controlled by the second hypervisor with the first hypervisor running simultaneously with the second hypervisor during the migration, the second hypervisor sharing access to the single path I/O device with the first hypervisor in different time slots, the first hypervisor and the second hypervisor using a mutex to coordinate the shared access to the single-path I/O device.

* * * * *